United States Patent
Wu

(10) Patent No.: US 9,307,748 B2
(45) Date of Patent: Apr. 12, 2016

(54) METHOD FOR PREVENTING FILTERING PLUG-IN CARD FROM DRIPPING LIQUID AND PLUG-IN-CARD TYPE LIQUID PURIFYING AND FILTERING DEVICE

(75) Inventor: Wang Wu, Shenzhen (CN)

(73) Assignee: Shenzhen Xingrisheng Industrial Co., Ltd., Shenzhen (CN)

( * ) Notice: Subject to any disclaimer, the term of this patent is extended or adjusted under 35 U.S.C. 154(b) by 204 days.

(21) Appl. No.: 14/007,413

(22) PCT Filed: Mar. 25, 2011

(86) PCT No.: PCT/CN2011/072183
§ 371 (c)(1),
(2), (4) Date: Dec. 9, 2013

(87) PCT Pub. No.: WO2012/129763
PCT Pub. Date: Oct. 4, 2012

(65) Prior Publication Data
US 2014/0291223 A1 Oct. 2, 2014

(51) Int. Cl.
*A01K 63/04* (2006.01)

(52) U.S. Cl.
CPC .......... *A01K 63/045* (2013.01); *Y10T 29/4973* (2015.01)

(58) Field of Classification Search
CPC ..................... A01K 63/045; Y10T 29/4973
USPC .......... 210/167.21, 167.22, 167.27, 232, 248; 119/259, 260
See application file for complete search history.

(56) References Cited

U.S. PATENT DOCUMENTS

| | | | |
|---|---|---|---|
| 5,294,335 A | 3/1994 | Chiang | |
| 5,728,293 A | 3/1998 | Guoli et al. | |

(Continued)

FOREIGN PATENT DOCUMENTS

| | | |
|---|---|---|
| CN | 2547131 | 4/2003 |
| CN | 2722624 | 9/2005 |

(Continued)

OTHER PUBLICATIONS

International Search Report for PCT Application No. PCT/CN2011/072183, dated Jan. 5, 2012, 4 pages.

*Primary Examiner* — Fred Prince
(74) *Attorney, Agent, or Firm* — Westman, Champlin & Koehler, P.A.

(57) ABSTRACT

The present invention relates to the method for preventing the liquid in the filtering plug-in card form dripping and a plug-in-card type liquid purifying and filtering device. The said liquid purifying and filtering device comprises the water pump, filtering cylinder and filtering plug-in card. In particular, at the top of the said filtering cylinder is equipped with the disassembled filtering plug-in card retainer. When the filtering plug-in card is taken out, such disassembled filtering plug-in card retainer is utilized to place the said filtering plug-in card, thus enabling such filtering plug-in card to leave the liquid level inside the filtering cylinder. In addition, it can set the disassembled top cap retainer for the said filtering cylinder. When the said top cap is disassembled, the disassembled top cap retainer is used to place the said top cap. In the course of replacing the said filtering plug-in card in the present invention, the liquid attached to the filtering plug-in card and liquid attached to the underside of the top cap are refluxed into the filter cylinder or water body, thus effectively preventing the liquid from dripping during the replacement of the filtering plug-in card and enabling the process of replacing the filtering plug-in card to be clean, simple and convenient.

10 Claims, 6 Drawing Sheets

(56) References Cited

U.S. PATENT DOCUMENTS 6,706,176 B1 3/2004 Goldman
2006/0060514 A1* 3/2006 Chauquet et al. ............. 210/169

FOREIGN PATENT DOCUMENTS

| | | |
|---|---|---|
| CN | 201383993 | 1/2010 |
| JP | 2007-97499 | 4/2007 |

* cited by examiner

METHOD FOR PREVENTING FILTERING PLUG-IN CARD FROM DRIPPING LIQUID AND PLUG-IN-CARD TYPE LIQUID PURIFYING AND FILTERING DEVICE

CROSS-REFERENCE TO RELATED APPLICATION

This Application is a Section 371 National Stage Application of International Application No. PCT/CN2011/072183, filed Mar. 25, 2011 and published as WO 2012/129763 on Oct. 4, 2012, not in English, the contents of which are hereby incorporated by reference in their entirety.

TECHNICAL FIELD

The present invention relates to the liquid purifying and filtering device that can filtrate impurities in the water body so as to purify the water body, in particular, to the plug-in-card type liquid purifying and filtering device applied to the aquarium breeding tank.

BACKGROUND ART

The plug-in-card type liquid purifying and filtering device with prior art comprises the water pump, filtering cylinder and filtering plug-in card. The said filtering plug-in card is installed inside the filtering cylinder. The said water pump pumps the liquid in the water body into the filtering cylinder. After the liquid in the filtering cylinder is purified by the said filtering plug-in card, it will be discharged from the said filtering cylinder and refluxed into the water body. The implementation of purifying treatment is repeated in cycles. The said filtering plug-in card includes the fixed frame and filter installed inside such fixed frame. There are close pinholes on the said filter. Such pinholes are utilized to sieve dirt and impurities inside the liquid flowing through such filter. The commonly used filters are filter cottons with various kinds of permeability. The said filter is chiefly used to execute the liquid filtering treatment. In order to execute the liquid purification treatment, inside the said filter or between two layers of filters is set with filtering materials that are useful to change the water body components and improve the water quality. Such filtering materials enable the water body components to be more suitable to their application environment. For instance, as regards the water body inside the aquarium breeding tank, the said filter materials can adopt granular ones that feature the function of absorbing harmful substances or the ion exchange function, such as active carbon or maifan stone. Besides, the granular filtering materials that can cultivate nitrifying bacteria can be adopted, such as zeolite. The said water body refers to the water body differently held in fixed containers. It can either be the water body stored in reservoirs that is used for the garden irrigation, or the water body inside the aquarium breeding tank. In order to prevent the liquid in the filtering cylinder from splashing, the plug-in-card type liquid purifying and filtering device with prior art is further equipped with the top cap covered at the bunghole of the said filtering cylinder. Obviously, many dirt and impurities will be deposited at the said filtering plug-in card upon long-term usage. Meanwhile, the filtering material inside the said filtering plug-in card needs to periodically be replaced. Therefore, the said filtering plug-in card is a component needing periodic replacement that is detachably set inside the said filtering cylinder in normal conditions.

The plug-in-card type purifying and filtering device with prior art have the following defects and shortcomings:

1. When the said filtering plug-in card is periodically replaced, the disassembled filtering plug-in card always has the liquid inside the filtering cylinder attached. During the replacement, the liquid attached to the said disassembled filtering plug-in card will drip. So it is necessary to clean the drippy liquid in the course of replacing the filtering plug-in card upon the completion of such replacement; in particular, as for the plug-in-card type liquid purifying and filtering device applied to the aquarium breeding tank, such operation of replacing the filtering plug-in card will soak the neighborhood of the aquarium breeding tank, thus affecting the fancy effects and wetting the neighboring ground of the aquarium breeding tank. In order not to affect fanciers and other relevant personnel, the neighborhood of the aquarium breeding tank must be cleaned and wiped upon the replacement of the said filtering plug-in card, thus enabling the process of replacing the said filtering plug-in card to be complicated, overloaded and inconvenient.

2. In the course of applying the said plug-in-card type liquid purifying and filtering device configured with the top cap, the liquid in the said filtering cylinder will splash or vaporizes to the underside of the top cap. When the said filtering plug-in card is replaced or the top cap is otherwise needed to be disassembled, the liquid attached to the underside of the disassembled top cap will similarly drip, thus incurring the issue of complicated and overloaded operation processes and inconvenience.

CONTENT OF THE INVENTION

In view of the above-described problems, the aim of the invention are to avoid defeats in the prior art and to provide a method for preventing the liquid flow in the filtering plug-in card from dripping and the plug-in-card type liquid purifying and filtering device using this method, thus enabling the process of replacing the filter latch to be clean, simple and convenient.

The purpose of the invention is achieved by the following technical schemes:

A method for preventing the liquid flow in the disassembled filtering plug-in card from dripping is implemented, which is based on the plug-in-card type liquid purifying and filtering device comprising the water pump, filtering cylinder and filtering plug-in card. The said filtering plug-in card is set inside the filtering cylinder. The said water pump pumps the liquid in the water body into the said filtering cylinder. After the liquid in the filtering cylinder is purified by the said filtering plug-in card, it will be discharged through the drain outlet of the filtering cylinder from the filtering cylinder. The said method includes the following steps:

A. Above the bunghole of the said filtering cylinder or the drain outlet is equipped with the disassembled filtering plug-in card retainer;

C. When the said filtering plug-in card is replaced, the filtering plug-in card to be replaced is taken out from the said filtering cylinder. Such filtering plug-in card is placed at the said disassembled filtering plug-in card retainer so that the liquid on the said filtering plug-in card can be drained.

When the said plug-in-card type liquid purifying and filtering device further comprises the top cap detachably covered at the bunghole of the said filtering cylinder, the following steps are further included between Step A and Step C:

B. At the bunghole of the said filtering cylinder is equipped with the disassembled top cap retainer;

The said Step C comprises the following sub-steps:

C1. When the said filtering plug-in card is replaced, the said top cap is disassembled and such top cap is placed at the said disassembled top cap retainer, thus enabling the bunghole of the said filtering cylinder to be opened and liquid attached to the bottom surface of the said top cap to be refluxed into the said filtering cylinder or water body;

C2. The filtering plug-in card to be replaced is taken out from the said filtering cylinder. Such filter plug-in card is placed at the said disassembled filtering plug-in card retainer so that the liquid on the said filtering plug-in card can be drained.

The purpose of the invention is achieved by the following technical schemes:

A plug-in-card type liquid purifying and filtering device that sets the post-disassembly retainer for detachable components is designed and manufactured, including the filtering cylinder, water pump pumping the liquid in the water body into the said filtering cylinder and filtering plug-in card detachably installed inside the said filtering cylinder. After the liquid pumped into the said filtering cylinder is purified by the said filtering plug-in card, it will be discharged through the drain outlet of the filtering cylinder from the filtering cylinder. In particular, at the top of the said filtering cylinder is equipped with the disassembled filtering plug-in card retainer. When the filtering plug-in card is taken out, such disassembled filtering plug-in card retainer is utilized to place the said filtering plug-in card, thus enabling such filtering plug-in card to leave the liquid level inside the filtering cylinder.

The said filtering cylinder specifically comprises the cylinder underside and cylinder cylindrical surface connected at the edge of such cylinder underside. The said cylinder cylindrical surface is surrounded by one front vertical wall, two side vertical walls directly opposite to each other and one rear vertical wall. The height of the said front vertical wall is less than that of the said rear vertical wall and two side vertical walls, thus forming the drain outlet at the top end of the front vertical wall and at the front end of two side vertical walls.

Based on the said filtering cylinder, the said disassembled filtering plug-in card retainer comprises two tabulate supports set in parallel, whose top ends are respectively equipped with recessed latch slots. The said two supports are set at the top end of the said front vertical wall and perpendicular to the plane where such front vertical wall is located. Meanwhile, the distance between these two supports shall not exceed the width of the said filtering plug-in card, thus enabling the disassembled filtering plug-in card to be inserted into the said latch slots and fixed.

Furthermore, the said filtering cylinder further comprises the draw-off channel. Such draw-off channel includes the horizontally set diversion surface that is connected to the top end of the said front vertical wall, the draw-off surface obliquely stretching downwards that is connected to the said diversion surface, the horizontally set guide surface that is connected to the bottom end of such draw-off surface as well as the channel side vertical walls respectively coupled with their corresponding side vertical walls that are respectively connected to the said diversion surface, draw-off surface and guide surface. The said disassembled filtering plug-in card retainer comprises two tabulate supports set in parallel, whose top ends are respectively equipped with recessed latch slots. The said two supports are set at the top surface of the said diversion surface and perpendicular to the plane where the said front vertical wall is located. Meanwhile, the distance between these two supports shall not exceed the width of the said filtering plug-in card, thus enabling the disassembled filtering plug-in card to be inserted into the said latch slots and fixed.

The depth of the said latch slot as stated in the above-mentioned proposal ensures the bottom for the said filtering plug-in card inserted into the said support fail to contact the liquid level under such filtering plug-in card.

The said plug-in-card type liquid purifying and filtering device further comprises the top cap that is detachably covered at the bunghole of the said filtering cylinder as well as the disassembled top cap retainer set at the said filtering cylinder. When the said top cap is disassembled, the said top cap is placed at the said disassembled top cap retainer, thus enabling the liquid attached to the internal wall of such top cap to be refluxed into the filtering cylinder or water body.

Specifically speaking, the said disassembled top cap retainer comprises two clamp vertical walls respectively set at the side vertical wall and rear vertical wall. The said two clamp vertical walls are located at the same plane parallel to the said rear vertical wall, thus forming the clamp gaps between two clamp vertical walls and the said rear vertical wall. One end of the disassembled top cap is inserted into the said clamp gap and fastened by clamps.

Compared to the prior art, technical effect of the invention entitled "Method for preventing filtering plug-in card from dripping liquid and plug-in-card type liquid purifying and filtering device" is that:

1. During the replacement of the said filtering plug-in card, the said disassembled filtering plug-in card retainer is temporarily utilized to fix the disassembled filtering plug-in card, thus enabling the liquid attached to such filtering plug-in card to be refluxed into the filtering cylinder or water body. After the liquid on the disassembled filter latch is drained, the said disassembled filtering plug-in card is taken down for recovery or discarding, thus effectively preventing the liquid from dripping during the replacement of the filtering plug-in card and enabling the process of replacing the filtering plug-in card to be clean, simple and convenient;

2. After the said top cap is disassembled, the said disassembled top cap retainer is similarly utilized to reflux the liquid attached to the underside of the top cap into the filtering cylinder or water body, thus preventing liquid from dripping and enabling the process of replacing the filtering plug-in card or any operation needing the opening of the top cap to be clean, simple and convenient.

MODE OF CARRYING OUT THE INVENTION MODEL

To further illustrate the principle and structure of the invention, the invention is further described in detail in accordance with the preferable embodiments shown in the figures.

Figure 1:
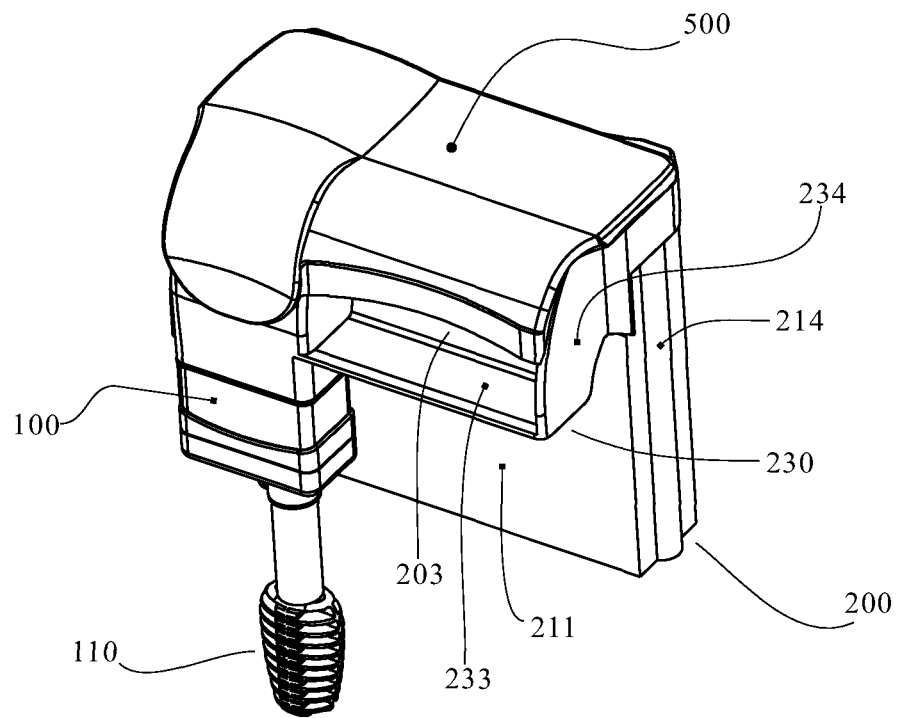
FIG. 1 represents the axonometric projection schematic diagram for the preferential embodiment of "Method for preventing filtering plug-in card from dripping liquid and plug-in-card type liquid purifying and filtering device" in the present invention.
Figure 2:
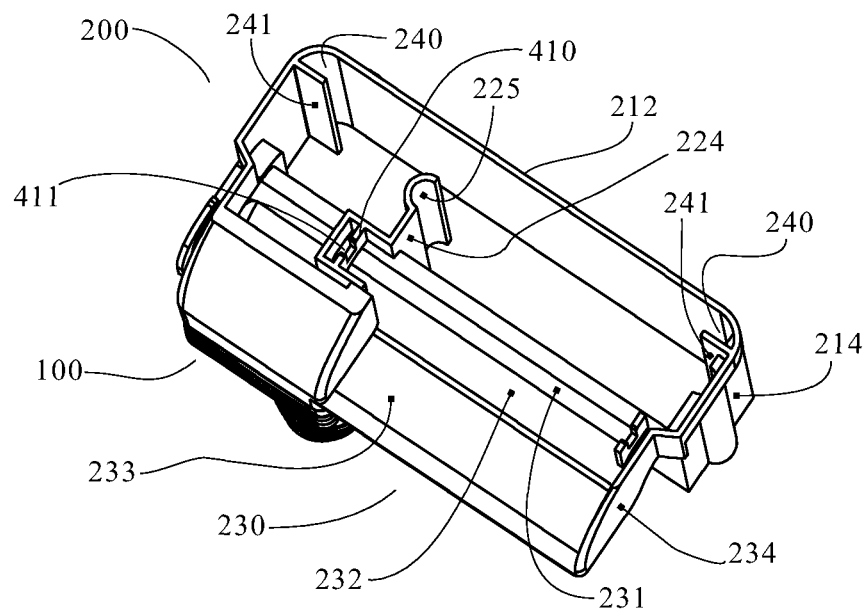
FIG. 2 represents the axonometric projection schematic diagram for the said preferential embodiment without the installation of the said top cap 500 and filtering plug-in card 300.
Figure 3:
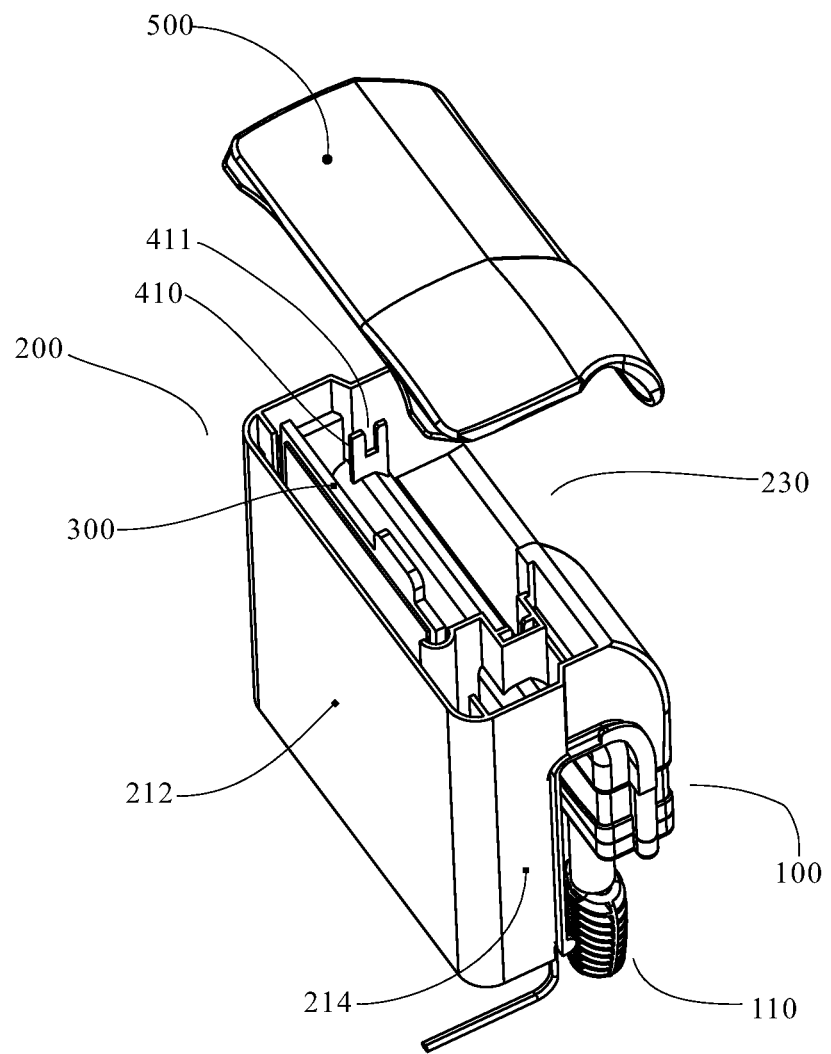
FIG. 3 represents the break-down axonometric projection schematic diagram for the said top cap 500 as set forth in the said preferential embodiment.
Figure 4:
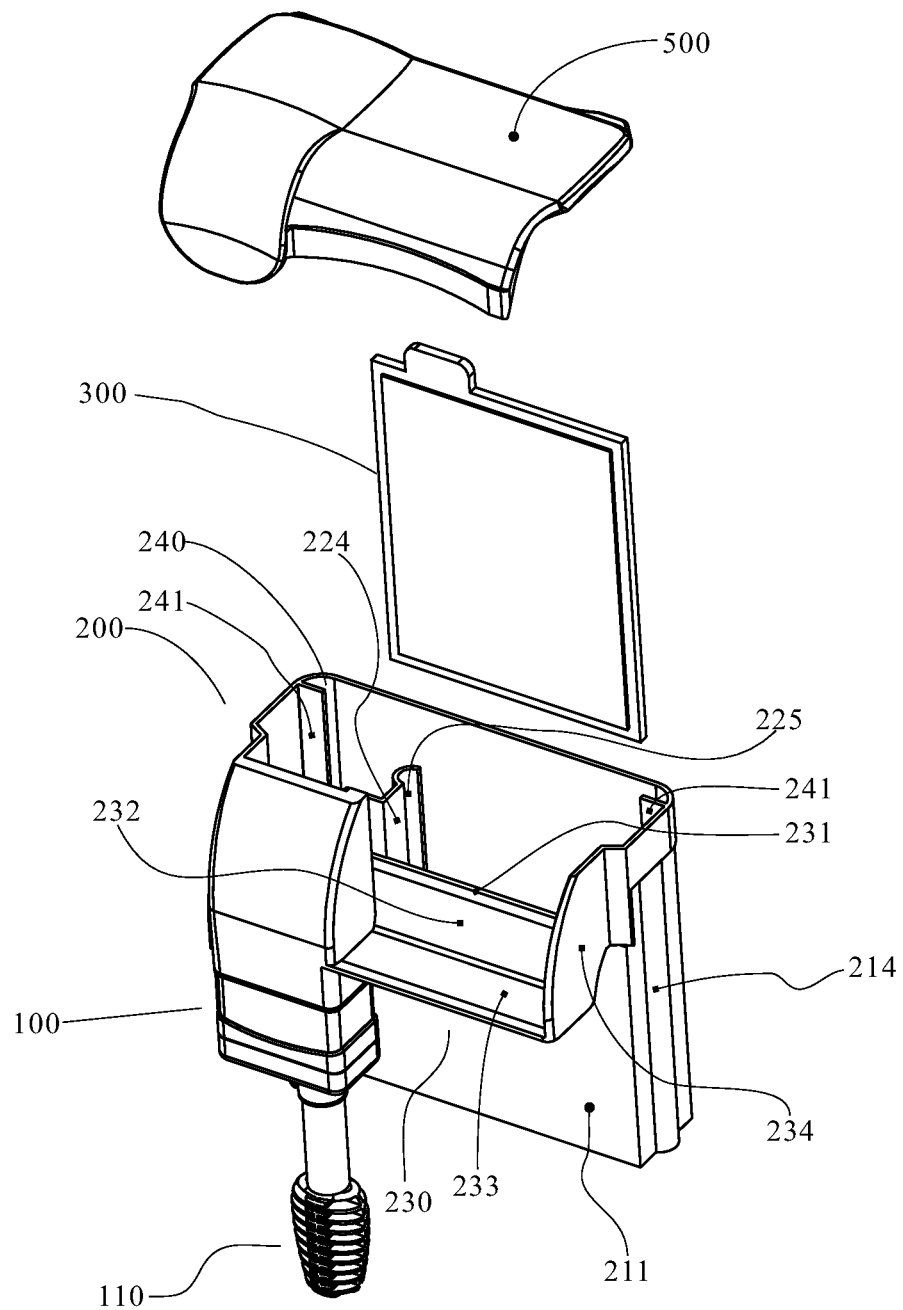
FIG. 4 means the break-down axonometric projection schematic diagram for the said top cap 500 and filtering plug-in card 300 as set forth in the said preferential embodiment.
Figure 5:
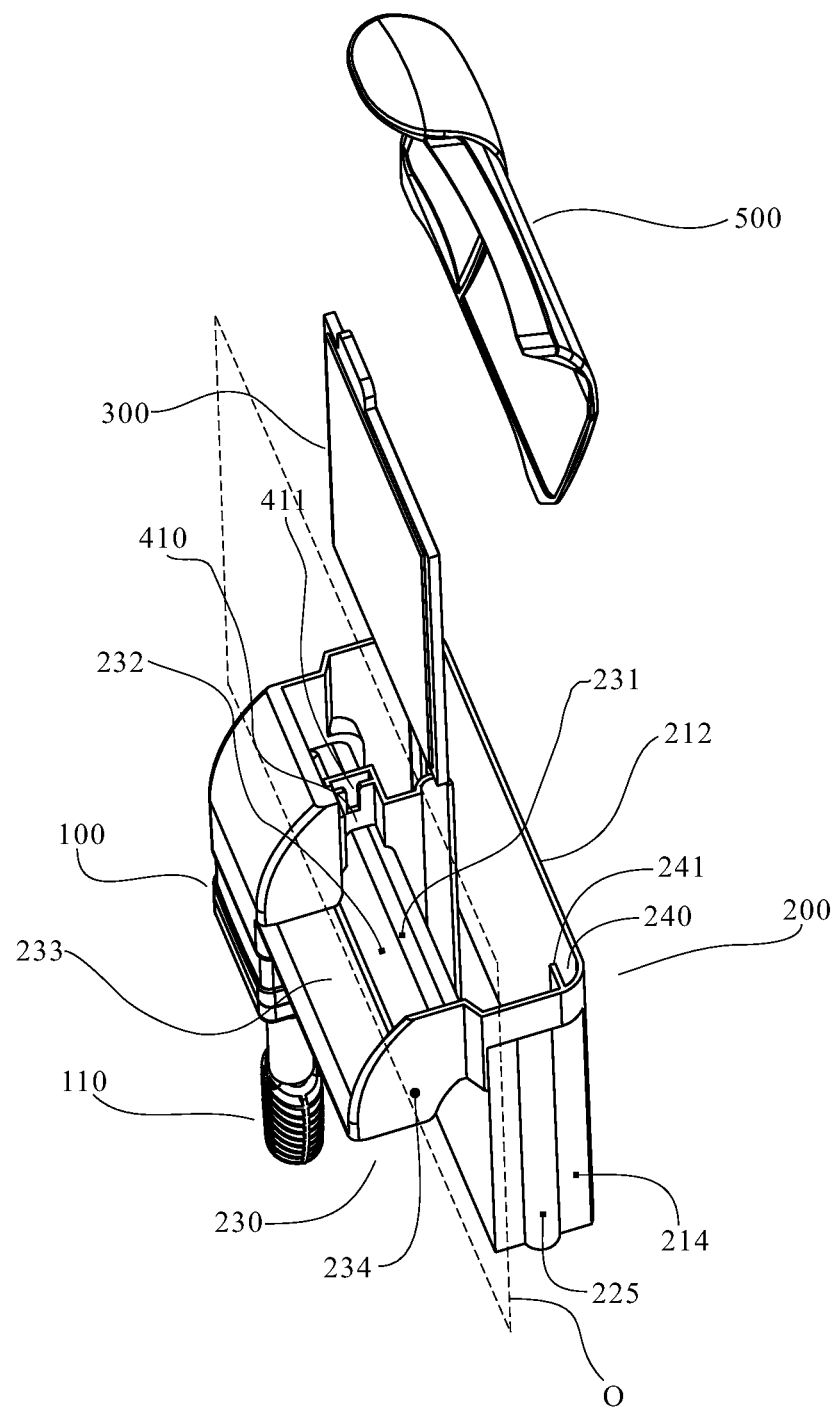
FIG. 5 means another break-down axonometric projection schematic diagram for the said top cap 500 and filtering plug-in card 300 as set forth in the said preferential embodiment.
Figure 6:
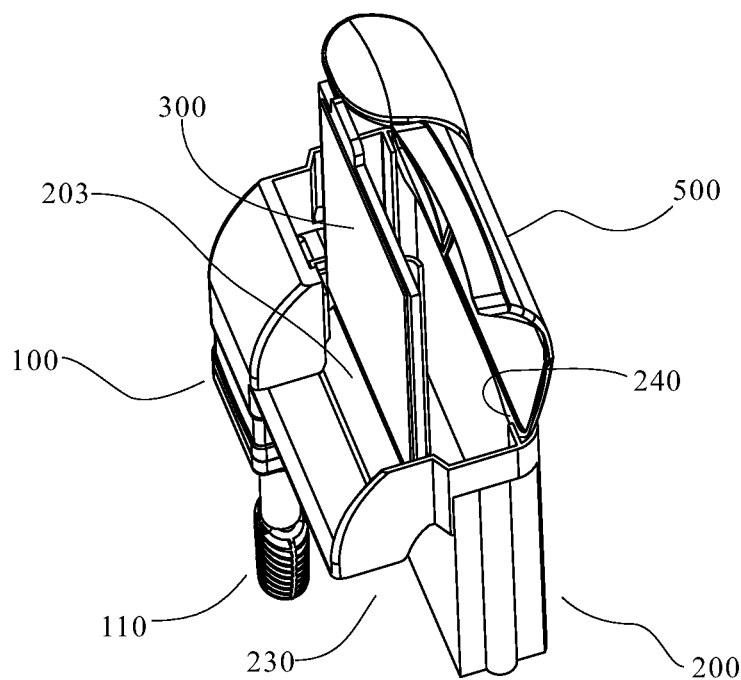
FIG. 6 means the axonometric projection schematic diagram for the said preferential embodiment when the said top cap 500 and filtering plug-in card 300 are installed at their respective post-disassembly retainers.

The present invention proposes a method for preventing the liquid flow in the disassembled filtering plug-in card from dripping is implemented, which is based on the plug-in-card type liquid purifying and filtering device comprising the water pump, filtering cylinder and filtering plug-in card. The said filtering plug-in card is set inside the filtering cylinder. The said water pump pumps the liquid in the water body into the said filtering cylinder. After the liquid in the filtering cylinder is purified by the said filtering plug-in card, it will be discharged through the drain outlet of the filtering cylinder from the filtering cylinder. The said method includes the following steps:

A. As can be shown in FIG. 2, FIG. 3 and FIG. 5, above the bunghole of the said filtering cylinder or the drain outlet is equipped with the disassembled filtering plug-in card retainer;

C. When the said filtering plug-in card is replaced as being shown in FIG. 4 and FIG. 5, the filtering plug-in card to be replaced is taken out from the said filtering cylinder as being shown in FIG. 6 and FIG. 7. Such filtering plug-in card is placed at the said disassembled filtering plug-in card retainer so that the liquid on the said filtering plug-in card can be drained.

In the course of ensuring the liquid to be drained in the said disassembled filtering plug-in card as set forth in Step C, of course the said liquid purifying and filtering device still works normally. The new filtering plug-in card shall be installed inside the filtering cylinder, namely, under such circumstances, the said liquid purifying and filtering device has two filtering plug-in cards inside it: one remains in the working state and is installed at the filtering plug-in card inside the said filtering cylinder, and the other is the disassembled filtering plug-in card temporarily set at the said disassembled filtering plug-in card retainer where the liquid attached to such filter latch is being drained.

Only after the liquid attached to the said disassembled filtering plug-in card is drained by the above-mentioned means can the said disassembled filtering plug-in card be removed from the said liquid purifying and filtering device. There is no need for adding cleaning or wiping steps for replacing the filtering plug-in card, thus enabling the process of replacing the filtering plug-in card to be clean, simple and convenient.

When the said plug-in-card type liquid purifying and filtering device further comprises the top cap detachably covered at the bunghole of the said filtering cylinder, the following steps are further included between Step A and Step C:

B. At the bunghole of the said filtering cylinder is equipped with the disassembled top cap retainer;

The said Step C comprises the following sub-steps:

C1. When the said filtering plug-in card is replaced, the said top cap is disassembled and such top cap is placed at the said disassembled top cap retainer, thus enabling the bunghole of the said filtering cylinder to be opened and liquid attached to the bottom surface of the said top cap to be refluxed into the said filtering cylinder or water body;

C2. The filtering plug-in card to be replaced is taken out from the said filtering cylinder. Such filtering plug-in card is placed at the said disassembled filtering plug-in card retainer so that the liquid on the said filtering plug-in card can be drained.

The above-mentioned steps can effectively prevent the splashing or vaporizing liquid at the underside of the said top cap from dripping. When the filtering plug-in card is replaced or the said top cap is otherwise needed to be disassembled, similarly there is no need for adding cleaning or wiping steps in the course of disassembling the top cap to which the liquid is attached, thus enabling the user to do the clean, simple and convenient maintenance work for the plug-in-card type liquid purifying and filtering device.

The present invention also proposes a plug-in-card type liquid purifying and filtering device that sets the post-disassembly retainer for detachable components for the purpose of realizing the aforementioned method. As can be shown in FIG. 1-8, it comprises the filtering cylinder 200, water pump 100 pumping the liquid in the water body into the said filtering cylinder 200 and filtering plug-in card 300 detachably installed inside the said filtering cylinder 200. The said water pump 100 comprises the water intake 110. After the liquid pumped into the said filtering cylinder 200 is purified by the said filtering plug-in card 300, it will be discharged through the drain outlet 203 of the filtering cylinder 200 from the filtering cylinder 200. In particular, at the top of the said filtering cylinder 200 is equipped with the disassembled filtering plug-in card retainer. When the filtering plug-in card 300 is taken out, such disassembled filtering plug-in card retainer is utilized to place the said filtering plug-in card 300, thus enabling such filtering plug-in card 300 to leave the liquid level inside the filtering cylinder 200.

The said filtering cylinder can adopt the following structures. The said filtering cylinder 200 comprises the cylinder underside 213 and cylinder cylindrical surface connected at the edge of such cylinder underside 213. The said cylinder cylindrical surface is surrounded by one front vertical wall 211, two side vertical walls 214 directly opposite to each other and one rear vertical wall 212. The height of the said front vertical wall 211 is less than that of the said rear vertical wall 212 and two side vertical walls 214, thus forming the drain outlet 203 at the top end of the front vertical wall 211 and at the front end of two side vertical walls 214.

Based on the abovementioned filtering cylinder structure, the said disassembled filtering plug-in card retainer comprises two tabulate supports set in parallel, whose top ends are respectively equipped with recessed latch slots. The said two supports are set at the top end of the said front vertical wall 211 and perpendicular to the plane O where such front vertical wall 211 is located. Meanwhile, the distance between these two supports shall not exceed the width of the said filtering plug-in card 300, thus enabling the disassembled filtering plug-in card to be inserted into the said latch slots and fixed.

The preferential embodiment of the present invention as being shown in FIG. 1-8 is more concrete than the abovementioned proposal. The said filtering cylinder 200 further comprises the draw-off channel 230. Such draw-off channel 230 includes the horizontally set diversion surface 231 that is connected to the top end of the said front vertical wall 211, the draw-off surface 232 obliquely stretching downwards that is connected to the said diversion surface 231, the horizontally set guide surface 233 that is connected to the bottom end of such draw-off surface 232 as well as the channel side vertical walls 234 respectively coupled with their corresponding side vertical walls 214 that are respectively connected to the said diversion surface 231, draw-off surface 232 and guide surface 233. The said disassembled filtering plug-in card retainer comprises two tabulate supports 410 set in parallel, whose top ends are respectively equipped with recessed latch slots 411. The said two supports 410 are set at the top surface of the said diversion surface 231 and perpendicular to the plane O where such front vertical wall 211 is located. Meanwhile, the distance between these two supports 410 shall not exceed the width of the said filtering plug-in card 300, thus enabling the disassembled filtering plug-in card 300 to be inserted into the said latch slots 411 and fixed.

Figure 7:
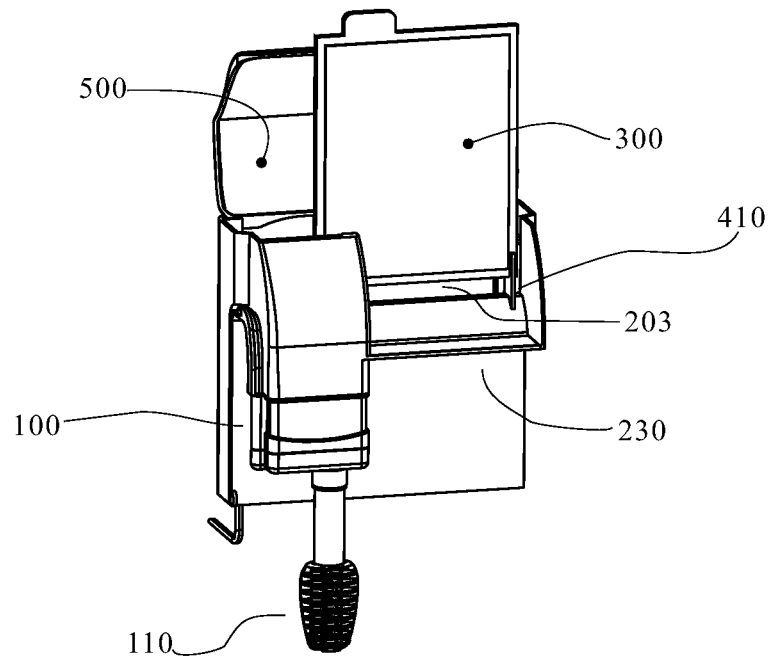
FIG. 7 means another axonometric projection schematic diagram for the said preferential embodiment when the said top cap 500 and filtering plug-in card 300 are installed at their respective post-disassembly retainers.
Figure 8:
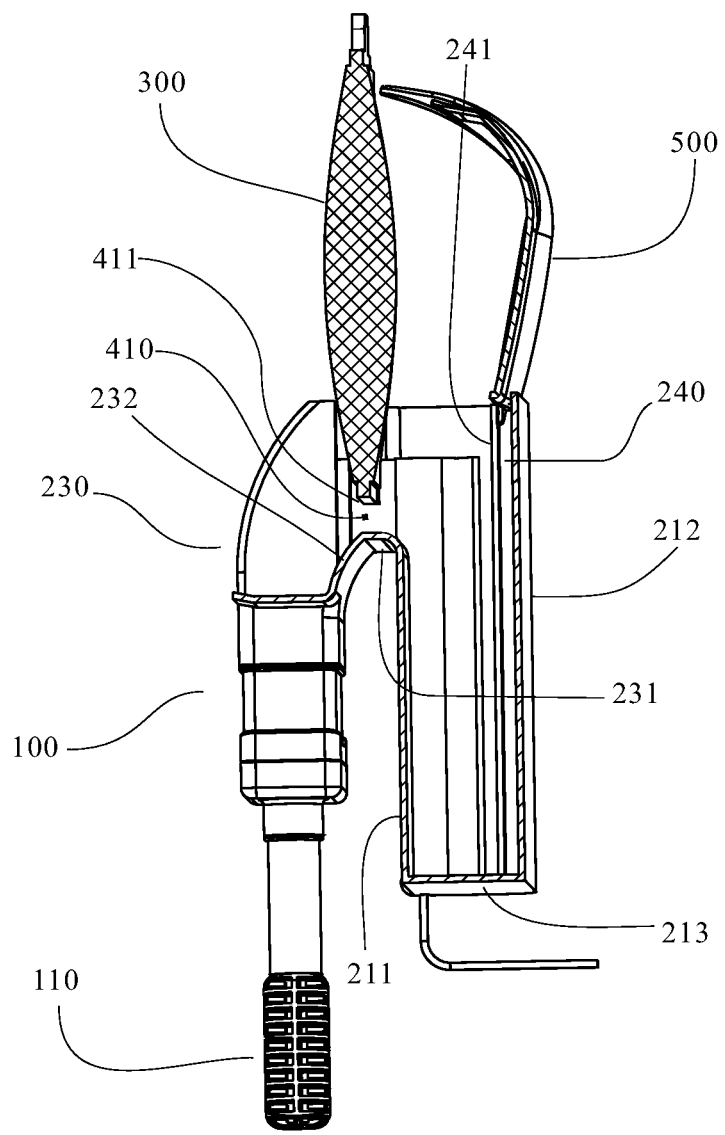
FIG. 8 means the axonometric projection schematic diagram when the said top cap 500, filtering plug-in card 300 and filtering cylinder 200 are sectioned as set forth in the said preferential embodiment.

As can be shown in FIG. 7, the depth of the said latch slot 411 ensures the bottom for the said filtering plug-in card 300 inserted into the said support 410 fail to contact the liquid level under such filtering plug-in card 300.

The said plug-in-card type liquid purifying and filtering device further comprises the top cap 500 that is detachably covered at the bunghole of the said filtering cylinder 200 as well as the disassembled top cap retainer set at the said filtering cylinder 200. When the said top cap 500 is disassembled, the said top cap 500 is placed at the said disassembled top cap retainer, thus enabling the liquid attached to the internal wall of such top cap to be refluxed into the filtering cylinder or water body.

Specifically speaking, in the preferential embodiment of the present invention as being shown in FIG. 1-8, the said filtering cylinder 200 comprises the cylinder underside 213 and cylinder cylindrical surface connected at the edge of such cylinder underside 213. The said cylinder cylindrical surface is surrounded by one front vertical wall 211, two side vertical walls 214 directly opposite to each other and one rear vertical wall 212. The height of the said front vertical wall 211 is less than that of the said rear vertical wall 212 and two side vertical walls 214, thus forming the drain outlet 203 at the top end of the front vertical wall 211 and at the front end of two side vertical walls 214. The said disassembled top cap retainer comprises two clamp vertical walls 241 respectively set at the side vertical wall 214 and rear vertical wall 212. The said two clamp vertical walls 241 are located at the same plane parallel to the said rear vertical wall 212, thus forming the clamp gaps 240 between two clamp vertical walls 241 and the said rear vertical wall 212. One end of the disassembled top cap 500 is inserted into the said clamp gap 240 and fastened by clamps.

In the preferential embodiment of the present invention, the said water pump 100 is set at one side of the draw-off channel 230. Inside the said filtering cylinder 200 is set with the partition vertical wall 224. Such partition vertical wall 244 is parallel to the side vertical wall 214 of the said filtering cylinder 200. At the said partition vertical wall 224 and side vertical wall 214 directly opposite to such partition vertical wall 224 are respectively equipped with the filter latch slot 225. Such filter latch slot is utilized to detachably fixing and install the said filtering plug-in card 300 inside the said filtering cylinder 200. FIG. 3-7 reflects the process of replacing the filtering plug-in card 300 in the preferential embodiment of the present invention: when the said filtering plug-in card is needed to be replaced as being shown in FIG. 3, the said top cap 500 is first disassembled; as can be shown in FIG. 4 and FIG. 5, subsequently the filtering plug-in card 300 needed to be replaced is taken out; as can be shown in FIG. 6 and FIG. 7, the said top cap 500 is inverted and one end of such top cap 500 is inserted into the said clamp gap 240, thus fixing the said top cap 500 and enabling the liquid attached to the underside of such top cap 500 to be refluxed into the said filtering cylinder 200; the said disassembled filtering plug-in card 300 is placed inside the latch slot 411 of the said support 410 so as to fix the said disassembled filtering plug-in card 300, thus enabling the liquid attached to the said filtering plug-in card 300 to be refluxed into the said filtering cylinder 200 or water body, until the liquid in the said disassembled filtering plug-in card 300 is drained. Subsequently in order to ensure the said liquid purifying and filtering device to remain in the normal working state, the new filtering plug-in card can be installed inside the said filtering cylinder 200. After the liquid on the said disassembled filtering plug-in card 300 is drained, the said disassembled filtering plug-in card 300 is taken down from the said support 410 for the purpose of recovering or discarding such filtering plug-in card 300; meanwhile, the said top cap 500 is taken down from the said clamp gap 240 and covered at the bunghole of the said filtering cylinder 200, thus completing the entire process of replacing the filtering plug-in card 300.

What is claimed is:

1. A plug-in-card type liquid purifying and filtering device that sets a post-disassembly retainer for detachable components, comprising a filtering cylinder, a water pump which pumps liquid in a water body into said filtering cylinder, and a filtering plug-in card that is detachably mounted inside said filtering cylinder; after the liquid pumped into said filtering cylinder is purified by said filtering plug-in card, said liquid will be discharged through the drain outlet for the filtering cylinder from the filtering cylinder; the device features that:

at the top of said filtering cylinder is equipped with a disassembled filtering plug-in card retainer, when the filtering plug-in card is taken out, said disassembled filtering plug-in card retainer is configured to place said filtering plug-in card, thus enabling said filtering plug-in card to leave the liquid level inside the filtering cylinder.

2. The plug-in-card type liquid purifying and filtering device that sets the post-disassembly retainer for detachable components according to claim 1 is characterized in that:

the said filtering cylinder includes the cylinder underside and cylinder cylindrical surface connected at the edge of such cylinder underside;

the said cylinder cylindrical surface is surrounded by one front vertical wall, two side vertical walls directly opposite to each other and one rear vertical wall;

the height for the said front vertical wall is less than that for the said rear vertical wall and two side vertical walls, thus forming the drain outlet at the top end of the front vertical wall and at the front end of two side vertical walls.

3. The plug-in-card type liquid purifying and filtering device that sets the post-assembly retainer for detachable components according to claim 2 is characterized in that:

the said disassembled filtering plug-in card retainer comprises two tabulate supports set in parallel, whose top ends are respectively equipped with recessed latch slots;

the said two supports are set at the top end of the said front vertical wall and perpendicular to the plane where such front vertical wall is located;

meanwhile, the distance between these two supports shall not exceed the width of the said filtering plug-in card, thus enabling the disassembled filtering plug-in card to be inserted into the said latch slots and fixed.

4. The plug-in-card type liquid purifying and filtering device that sets the post-disassembly retainer for detachable components according to claim 3 is characterized in that:

the depth of the said latch slot ensures the bottom for the said filtering plug-in card inserted into the said support fail to contact the liquid level under such filtering plug-in card.

5. The plug-in-card type liquid purifying and filtering device that sets the post-disassembly retainer for detachable components according to claim 2 is characterized in that:

the said filtering cylinder further comprises the draw-off channel; such draw-off channel includes the horizontally set diversion surface that is connected to the top end of the said front vertical wall, the draw-off surface obliquely stretching downwards that is connected to the said diversion surface, the horizontally set guide surface that is connected to the bottom end of such draw-off surface as well as the channel side vertical walls respectively coupled with their corresponding side vertical walls that are respectively connected to the said diversion surface, draw-off surface and guide surface;

the said disassembled filtering plug-in card retainer comprises two tabulate supports set in parallel, whose top ends are respectively equipped with recessed latch slots;

the said two supports are set at the top surface of the said diversion surface and perpendicular to the plane where such front vertical wall is located, meanwhile, the distance between these two supports shall not exceed the width of the said filtering plug-in card, thus enabling the disassembled filtering plug-in card to be inserted into the said latch slots and fixed.

6. The plug-in-card type liquid purifying and filtering device that sets the post-disassembly retainer for detachable components according to claim 5 is characterized in that:

the depth of the said latch slot ensures the bottom for the said filtering plug-in card inserted into the said support fail to contact the liquid level under such filtering plug-in card.

7. The plug-in-card type liquid purifying and filtering device that sets the post-disassembly retainer for detachable components according to claim 5 is characterized in that:

the said filtering cylinder includes the cylinder underside and cylinder cylindrical surface connected at the edge of such cylinder underside, the said cylinder cylindrical surface is surrounded by one front vertical wall, two side vertical walls directly opposite to each other and one rear vertical wall; the height for the said front vertical wall is less than that for the said rear vertical wall and two side vertical walls, thus forming the drain outlet at the top of the front vertical wall and at the front end of two side vertical walls;

the said disassembled top cap retainer comprises two clamp vertical walls respectively set at the side vertical walls and rear vertical walls;

the said two clamp vertical walls are located at the same plane parallel to the said rear vertical wall, thus forming two clamp gaps between two clamp vertical walls and the said rear vertical wall, one end of the disassembled top cap is inserted into the said clamp gap and fastened by clamps.

8. The plug-in-card type liquid purifying and filtering device that sets the post-disassembly retainer for detachable components according to claim 1 is characterized in that:

it further comprises the top cap that is detachably covered at the bunghole of the said filtering cylinder as well as the disassembled top cap retainer set at the said filtering cylinder, when the said top cap is disassembled, the said top cap is placed at the said disassembled top cap retainer, thus enabling the liquid attached to the internal wall of such top cap to be refluxed into the filtering cylinder or water body.

9. A method for preventing liquid flow in a disassembled filtering plug-in card from dripping, which is based on a plug-in-card liquid purifying and filtering device comprising a water pump, filtering cylinder and filtering plug-in card; said filtering plug-in card is set inside the filtering cylinder; said water pump pumps liquid in a water body into said filtering cylinder, after the liquid in the filtering cylinder is purified by said filtering plug-in card, the liquid will be discharged through the drain outlet of the filtering cylinder from the filtering cylinder; the method features that said method include the following steps:

A. above a bunghole of said filtering cylinder or the drain outlet is equipped with a disassembled filtering plug-in card retainer;

C. when said filtering plug-in card is replaced, the filtering plug-in card to be replaced is taken out from the said filtering cylinder, said filtering plug-in card is placed at said disassembled filtering plug-in card retainer so that the liquid on said filtering plug-in card can be drained.

10. The method for preventing the liquid flow in the disassembled filtering plug-in card from dripping according to claim 9 is characterized in that:

the said plug-in-card type liquid purifying and filtering device further comprises the top cap detachably covered at the bunghole of the said filtering cylinder, the following steps are further included between Step A and Step C, B. at the bunghole of the said filtering cylinder is equipped with the disassembled top cap retainer;

the said Step C comprises the following sub-steps,

C1. when the said filtering plug-in card is replaced, the said top cap is disassembled and such top cap is placed at the said disassembled top cap retainer, thus enabling the bunghole of the said filtering cylinder to be opened and liquid attached to the bottom surface of the said top cap to be refluxed into the said filtering cylinder or water body;

C2. the filtering plug-in card to be replaced is taken out from the said filtering cylinder, such filtering plug-in card is placed at the said disassembled filtering plug-in card retainer so that the liquid on the said filtering plug-in card can be drained.

* * * * *